United States Patent
Benning et al.

(10) Patent No.: US 7,390,423 B2
(45) Date of Patent: Jun. 24, 2008

(54) SELF-CLEANING COLLOIDAL SLURRY COMPOSITION AND PROCESS FOR FINISHING A SURFACE OF A SUBSTRATE

(75) Inventors: Frederick Paul Benning, Rochester, MN (US); James A. Hagan, Rochester, MN (US); Steven L. Maynard, Rochester, MN (US); David C. Paurus, Byron, MN (US); Douglas Howard Piltingsrud, Eyota, MN (US); Jon Edward Podolske, Plainview, MN (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 11/008,806

(22) Filed: Dec. 9, 2004

(65) Prior Publication Data
US 2005/0098758 A1 May 12, 2005

Related U.S. Application Data

(62) Division of application No. 09/976,167, filed on Oct. 12, 2001.

(51) Int. Cl.
*B44C 1/22* (2006.01)
(52) U.S. Cl. .............................. 216/89; 216/22; 216/88; 216/91; 216/92; 451/36; 252/79.1
(58) Field of Classification Search ............. 216/88–92, 216/22; 451/36; 252/79.1
See application file for complete search history.

(56) References Cited

U.S. PATENT DOCUMENTS 4,645,561 A  2/1987  Rea

| | | | |
|---|---|---|---|
| 5,340,370 A | | 8/1994 | Cadien et al. |
| 5,527,423 A | | 6/1996 | Neville et al. |
| 5,686,258 A | * | 11/1997 | Akhavan-Tafti et al. .... 435/7.91 |
| 5,707,948 A | * | 1/1998 | Evers et al. ................. 510/217 |
| 5,723,181 A | * | 3/1998 | Roberts ...................... 472/353 |

(Continued)

OTHER PUBLICATIONS

Product Information Sheet, "SRS 596 Specially Processed Cerium Oxide in an Aqueous Slurry," Ferro Electronic Materials, Penn Yan, New York, dated May 18, 2001, Revision 1.

(Continued)

*Primary Examiner*—Shamim Ahmed
(74) *Attorney, Agent, or Firm*—Matthew J. Bussan (57) ABSTRACT

A self-cleaning colloidal slurry and process for finishing a surface of a glass, ceramic, glass-ceramic, metal or alloy substrate for use in a data storage device, for example. The slurry comprises a carrying fluid, colloidal particles, etchant, and a surfactant adsorbed and/or precipitated onto a surface of the colloidal particles and/or substrate. The surfactant has a hydrophobic section that forms a steric hindrance barrier and substantially prevents contaminates, including colloidal particles, from bonding to the substrate surface. The slurry is applied to the surface of the substrate while a pad mechanically rubs the surface. Subsequent cleaning with standard soap solutions removes substantially all remaining contamination from the substrate surface. In an exemplary embodiment, the slurry is used to superfinish a glass disk substrate to a surface roughness of less than 2 Å, with substantially no surface contamination as seen by atomic force microscopy (AFM) after standard soap cleaning steps.

11 Claims, 6 Drawing Sheets

U.S. PATENT DOCUMENTS

| | | | |
|---|---|---|---|
| 5,846,398 A | 12/1998 | Carpio | |
| 5,876,490 A | 3/1999 | Ronay | |
| 5,968,239 A | 10/1999 | Miyashita et al. | |
| 6,015,506 A | 1/2000 | Streinz et al. | |
| 6,140,300 A * | 10/2000 | Sirianni | 510/380 |
| 6,236,542 B1 | 5/2001 | Hartog et al. | |
| 6,251,150 B1 | 6/2001 | Small et al. | |
| 6,268,979 B1 * | 7/2001 | Kuroda | 360/135 |
| 6,402,851 B1 | 6/2002 | Piltingsrud | |
| 6,413,441 B1 * | 7/2002 | Levin | 252/62.52 |
| 6,423,148 B1 * | 7/2002 | Aoki | 134/3 |
| 6,454,871 B1 | 9/2002 | Labib et al. | |
| 6,630,403 B2 | 10/2003 | Kramer et al. | |
| 6,676,718 B2 | 1/2004 | Luo et al. | |
| 6,720,264 B2 * | 4/2004 | Sahota et al. | 438/692 |
| 6,872,328 B2 * | 3/2005 | Dirksen et al. | 252/79.1 |
| 2002/0148997 A1 | 10/2002 | Minamihaba et al. | |
| 2003/0077416 A1 | 4/2003 | Liao | |
| 2003/0092362 A1 * | 5/2003 | McCaffrey et al. | 451/41 |

OTHER PUBLICATIONS

Product Inofrmation Sheet, "SRS 565 Colliodal Silica Based Polishing Slurry," Ferro Electronic Materials, Penn Yan, New York, dated Jan. 18, 2001, rev nil.

* cited by examiner

SELF-CLEANING COLLOIDAL SLURRY COMPOSITION AND PROCESS FOR FINISHING A SURFACE OF A SUBSTRATE

CROSS-REFERENCE TO RELATED APPLICATION CLAIMING BENEFIT UNDER 35 U.S.C. 120

This application is a divisional application of U.S. patent application Ser. No. 09/976,167, filed Oct. 12, 2001, entitled "SELF-CLEANING COLLOIDAL SLURRY COMPOSITION AND PROCESS FOR FINISHING A SURFACE OF A SUBSTRATE", which is incorporated by reference.

FIELD OF THE INVENTION

The present invention relates in general to colloidal slurry compositions and processes for finishing a surface of a substrate. More particularly, the present invention relates to a self-cleaning colloidal slurry composition and process that may be used, for example, to superfinish or texture a surface of a substrate for a data storage device.

BACKGROUND

A typical data storage device includes a medium for storing data, typically in magnetic, magneto-optical or optical form, and a transducer used to write and read data respectively to and from the medium. A disk drive data storage device, for example, includes one or more data storage disks coaxially mounted on a hub of a spindle motor. The spindle motor rotates the data storage disks at speeds typically on the order of several thousand or more revolutions-per-minute. Digital information, representing various types of data, is typically written to and read from the data storage disks by one or more transducers, or read/write heads, which are mounted to an actuator assembly and passed over the surface of the rapidly rotating disks.

In a typical magnetic disk drive, for example, data is stored on a magnetic layer coated on a disk substrate. Several characteristics of disk substrates significantly affect the areal density of a disk drive. One such characteristic that significantly affects the areal density of a disk drive is the uniformity of the surface of the disk substrate, i.e., the absence of substrate surface defects. It is generally recognized that minimizing the flyheight, i.e., the clearance distance between the read/write head and the surface of a data storage disk, generally provides for increased areal densities. It is also recognized in the art, however, that the smoothness of the surface of a data storage disk becomes a critical factor and design constraint when attempting to minimize the flyheight. A significant decrease in flyheight provided by the use of data storage disks having highly uniform recording surfaces can advantageously result in increased transducer readback sensitivity and increased areal density of the disk drive. The uniformity of disk substrate surfaces affects the uniformity of the recording surfaces because the layers sputtered onto the disk substrate, such as the magnetic layer, replicate any irregular surface morphology of the disk substrate.

Conventionally, disk substrates have been based upon aluminum, such as NiP coated Al/Mg alloy substrates. Coating the aluminum magnesium alloy with a nickel-phosphorus plate provides a harder exterior surface which allows the disk substrate to be polished and superfinished. A conventional superfinishing process and slurry is described in U.S. Pat. No. 6,236,542 to Hartog et al., which is assigned to the assignee of the present application. Typically, the Al/Mg—NiP substrate is superfinished to a smooth finish with a colloidal slurry, e.g., a pH adjusted aqueous slurry containing colloidal silica and/or colloidal alumina particles and an etching agent such as aluminum nitrate, prior to sputtering with thin film magnetic coatings. The colloidal alumina and silica slurries are then cleaned from the substrate by the general cleaning mechanisms of mechanical scrubbing, dispersion and etching. Surfactants and pH are generally used for dispersion cleaning, where the surfactant and pH act to separate the slurry particles from each other and from the substrate. Etching is generally accomplished by acids and acid soaps that erode or dissolve the substrate material beneath embedded slurry particles (under-cut) to release them from the substrate. Typical acids in use for NiP plated Al-based substrates include, for example, straight phosphoric acid, nitric acid, hydrofluoric acid-based soaps and phosphoric acid-based soaps. The straight acids generally have a pH less than 1 and the soaps generally have pH's above 1.

After cleaning, the substrates are sputtered with a series of layers, e.g., a chrome underlayer, a magnetic layer and a carbon protection layer. If residual slurry particles are left on the substrate or if there is galling to the relatively soft NiP layer, the sputtered layers replicate the irregular surface morphology, creating a bumpy surface on the finished disk. When the read/write head glides over the surface, it crashes into bumps created by the residual particles and/or damage that is higher than the glide clearance. This is known as a glide defect, which can ultimately cause disk drive failure. These bumps further cause magnetic defects, corrosion and decreased disk life. Thus, the residual slurry particles and/or damage needs to be removed from the superfinished substrate surface so that the substrate is as smooth as possible.

Unfortunately, aluminum-based substrates have relatively low specific stiffness, as well as relatively low impact and dent resistance. For example, the relatively low specific stiffness of the Al/Mg—NiP substrates (typically 3.8 Mpsi/gm/cc) makes this type of disk substrate susceptible to environmental forces which create disk flutter and vibration and which may cause the read/write head to impact and dent the disk substrate surface.

More recently, glass substrates have been used for disk drives in portable devices, such as laptop computers. Glass substrates have a higher impact and dent resistance than aluminum-based substrates, which is important in portable devices where the unit is subject to being bumped, dropped and banged around, causing the read/write head to bang on the disk substrate surface. Moreover, the specific stiffness of glass or glass-ceramic substrates (typically $\leq 6$ or 7 Mpsi/gm/cc) is typically higher than that of aluminum-based substrates.

An additional benefit of glass is that it is easier to polish to and maintain as a smooth surface finish (as compared to NiP) than aluminum-based substrates. A smoother substrate allows the read/write head to fly closer to the disk, which produces a higher density recording. Glide height for some computer disk drives is on the order of 20 nanometers (about 200 Å) and less, which is an extremely small interface distance. Thus, the fact that glass substrates can be polished to smoother finishes makes an industry shift from Al-based substrates to glass substrates desirable, not only for disk drives used in portable devices, but for disk drives used in stationary devices as well.

The surface uniformity of glass substrates can still present a problem, however, especially for low glide heights (typically $\leq 20$ nanometers) and near contact recording. Just as with aluminum-based substrates, the surface of the glass substrate needs to be polished and superfinished with a slurry to provide an atomically smooth surface prior to sputtering. Such a conventional superfinishing polish process and slurry is also described in the above referenced U.S. Pat. No. 6,236,542 to Hartog et al. Typically, the glass substrate is superfinished to a smooth finish with a colloidal slurry, e.g., a pH adjusted aqueous slurry containing colloidal silica and/or colloidal alumina particles and an etching agent such as cerium sulfate, prior to sputtering with thin film magnetic coatings.

In this conventional superfinishing polish process colloidal silica particles attach to the surface being polished not only by the usual London dispersion forces, van der Waals forces and hydrogen bonding, but unlike NiP, also by molecular bonding even though the slurry has the usual stabilizing agents used in the colloidal silica to prevent the silica particles from sticking to each other (interparticle siloxane bonding), charge repulsion and/or steric stabilizers. Standard methods of scrubbing with soaps using polyvinyl alcohol (PVA) pads, ultrasonics or megasonics will not remove any significant percentage of such molecular bonded silica particles. Just as with aluminum-based substrates, if these particles are left in place on the glass substrate, glide defects occur that can ultimately cause disk drive failure. These glide defects further cause magnetic defects, corrosion and decreased disk life.

An apparent solution to this problem would be to use stronger acid or base solutions than the cleaning soap, to etch the glass substrate or undercut the slurry particles similar to what can be done to remove hard alpha alumina from Al/Mg—NiP substrates after non-superfinish polish slurries. The surface finish of glass and NiP substrates are, however, damaged by such a technique by surface topography change such as pitting and chemical composition changes. Glass has low resistance to acid etching and overly aggressive acid solutions, such as hydrofluoric acid and caustic etching at high pH's and temperatures. Damage and compositional change to the superfinished glass surface will adversely affect the morphology of layers deposited by subsequent sputtering processes and can cause magnetic, glide and corrosion failures. Moreover, acid or base etching adds to the equipment requirements, production cycle times and cost.

Another apparent solution to this problem would be to micropolish the surface of the glass substrate, e.g., by using a burnishing head, to remove the glide defects prior to applying the sputtered layers, such as a magnetic layer and a carbon protection layer. However, glass substrates cannot be effectively micropolished because applying the burnishing head to the glass surface can cause micro-fracturing rather than just a surface levelling. The micro-fractured site becomes a risk for corrosion and/or a growing defect. Moreover, micropolishing adds to the equipment requirements, production cycle times and cost.

Yet another solution to this problem is to use a cleaning polish etch solution/process (a process performed by running disk substrates on a polishing pad using an etch solution instead of a slurry, i.e., there are no slurry particles in the cleaning polish etch solution) with acid, neutral or base solutions to etch the glass substrate and/or the attached slurry particles under polish conditions thereby maintaining the superfinish surface while removing the superfinish polish slurry debris by etching and dilution. Such a cleaning polish etch solution/process is as disclosed in U.S. patent application Ser. No. 09/976,408, filed Oct. 12, 2001, entitled "CLEANING POLISH ETCH COMPOSITION AND PROCESS FOR A SUPERFINISHED SURFACE OF A SUBSTRATE", now abandoned. Etching by itself (i.e., the first solution discussed above) with PVA scrub, ultrasonics or megasonics is what has been done to remove slurry particles from Al/Mg—NiP or glass substrates, but with the less than 20 nm glide heights now in use, a cleaning polish etch solution/process is needed to ensure 100% surface cleaning of particles that small (i.e., the lower the glide height, the smaller the particles needing to be removed, and thus the more difficult they are to remove) while maintaining the surface finish. The cleaning polish etch process, however, adds equipment and handling costs. Nonetheless, without the cleaning polish etch process the surface of the glass substrate can be damaged by using only chemical etch due to the low resistance of the glass material to acid etching or overly aggressive caustic etch solutions.

Another example of a colloidal slurry that may be used to superfinish a glass substrate is Ferro SRS 596 "Specially Processed Cerium Oxide in an Aqueous Slurry" available from Ferro Electronic Materials, Penn Yan, N.Y. The Ferro SRS 596 slurry is thought to be composed of <50% lanthanum series oxides and fluorides, <20% amorphous fumed silica and <2% titanium dioxide. The average particle size is 500 nm and the slurry has pH 7-10. Because the Ferro SRS 596 slurry contains rare earth oxides (lanthanum series oxides), one or more of the cleaning mechanisms (e.g., etching via a special strong acid cleaning) discussed above are needed to remove these particles. In addition, because the Ferro SRS 596 slurry contains fumed silica, scratching of the substrate surface results due to the inherent presence of silica aggregates in the fumed silica, limiting the surface finish possible.

If the market trend toward glass substrates in disk drives is to succeed, a mechanism other than the cleaning techniques of etching, micropolishing, or cleaning polish etch, is required for mitigating slurry particles which adhere to the surfaces of the substrates that are finished using a slurry. Preferably, such a mechanism would improve production cycle times and costs (as compared to the cleaning techniques of etching, micropolishing, or cleaning polish etch), but would not alter the finish of the substrate or surface stability to corrosion.

SUMMARY OF THE INVENTION

An object of the present invention is to provide an enhanced contamination mitigation mechanism for substrates that are finished using a slurry.

Another object of the present invention is to provide an enhanced contamination mitigation mechanism that improves production cycle times and costs (as compared to the cleaning techniques of etching, micropolishing or cleaning polish etch) for substrates that are finished using a slurry.

Yet another object of the present invention is to provide an enhanced contamination mitigation mechanism that does not alter the finish of the substrate or surface stability to corrosion for substrates that are finished using a slurry.

Still another object of the present invention is to provide a glass disk substrate that has a finished surface with essentially no surface contamination from the finishing slurry even though the surface was not subjected to the cleaning techniques of etching, micropolishing or cleaning polish etch.

It is still another object of the present invention to provide a data storage disk which includes a recording layer applied over a glass disk substrate that has a finished surface with essentially no surface contamination from the finishing slurry even though the surface was not subjected to the cleaning techniques of etching, micropolishing or cleaning polish etch.

Still another object of the present invention is to provide a data storage device having a data storage disk which includes a recording layer applied over a glass disk substrate that has a finished surface with essentially no surface contamination from the finishing slurry even though the surface was not subjected to the cleaning techniques of etching, micropolishing or cleaning polish etch.

These and other objects of the present invention are achieved by a self-cleaning colloidal slurry and process for finishing a surface of a substrate. The self-cleaning colloidal slurry comprises a carrying fluid, colloidal particles, etchant for etching the substrate, and a surfactant adsorbed onto a surface of the colloidal particles and/or the substrate. The surfactant has a hydrophobic section that forms a steric hindrance barrier between the colloidal particles and the substrate, and substantially prevents contaminates, including the colloidal particles, from bonding to the surface of the substrate. The self-cleaning colloidal slurry is applied to the surface of the substrate while a pad mechanically rubs the surface. Subsequent cleaning with standard soap solutions removes substantially all remaining contamination from the surface of the substrate.

In an exemplary embodiment, the self-cleaning colloidal slurry is used to superfinish a glass disk substrate to a surface roughness of less than 2 Å, with substantially no surface contamination as seen by atomic force microscope (AFM) after standard soap cleaning steps and by the greater than 90% glide yield (<10% of the disk substrates have glide failures) at 8 nm flyheight. A data storage disk for use in a data storage device may be provided by applying a recording layer over the superfinished surface of the glass disk substrate.

In another exemplary embodiment, the self-cleaning colloidal slurry is used to texture a glass disk substrate (i.e., provide a circumferential texture pattern on the surface thereof), with substantially no surface contamination as seen by atomic force microscope (AFM) after standard soap cleaning steps. A data storage disk for use in a data storage device may be provided by applying a recording layer over the textured surface of the glass disk substrate.

BRIEF DESCRIPTION OF THE DRAWINGS

The present invention together with the above and other objects and advantages can best be understood from the following detailed description of the embodiments of the invention illustrated in the drawings, wherein like reference numerals denote like elements.

DETAILED DESCRIPTION OF THE PREFERRED EMBODIMENTS

Overview

The present invention utilizes a self-cleaning colloidal slurry and process for superfinishing a surface of a substrate (e.g., glass, glass-ceramic, ceramic, metal or alloy). The self-cleaning colloidal slurry comprises a carrying fluid, colloidal particles (e.g., colloidal silica or colloidal alumina), etchant (e.g., metal etchant such as Ce, Zr, Ti, Fe, Sn, Al, Cr, Ni, Mn or Zn) for etching the substrate, and a surfactant (e.g., non-ionic, cationic or anionic) adsorbed onto a surface of the colloidal particles and/or the substrate. The surfactant has a hydrophobic section that forms a steric hindrance barrier between the colloidal particles and the substrate, and substantially prevents contaminates, including the colloidal particles, from bonding to the surface of the substrate. The self-cleaning colloidal slurry is applied to the surface of the substrate while a pad mechanically rubs the surface. Subsequent cleaning with standard soap solutions removes substantially all remaining contamination from the surface of the substrate.

In an exemplary embodiment that is described in greater detail below, the self-cleaning colloidal slurry is used to polish a glass disk substrate to a surface roughness of less than 2 Å, with substantially no surface contamination as seen by atomic force microscope (AFM) after standard soap cleaning steps and by the greater than 90% glide yield (<10% of the disk substrates have glide failures) at 8 nm flyheight. A data storage disk for use in a data storage device may be provided by applying a recording layer over the superfinished surface of the glass disk substrate.

The Data Storage Device

Figure 1:
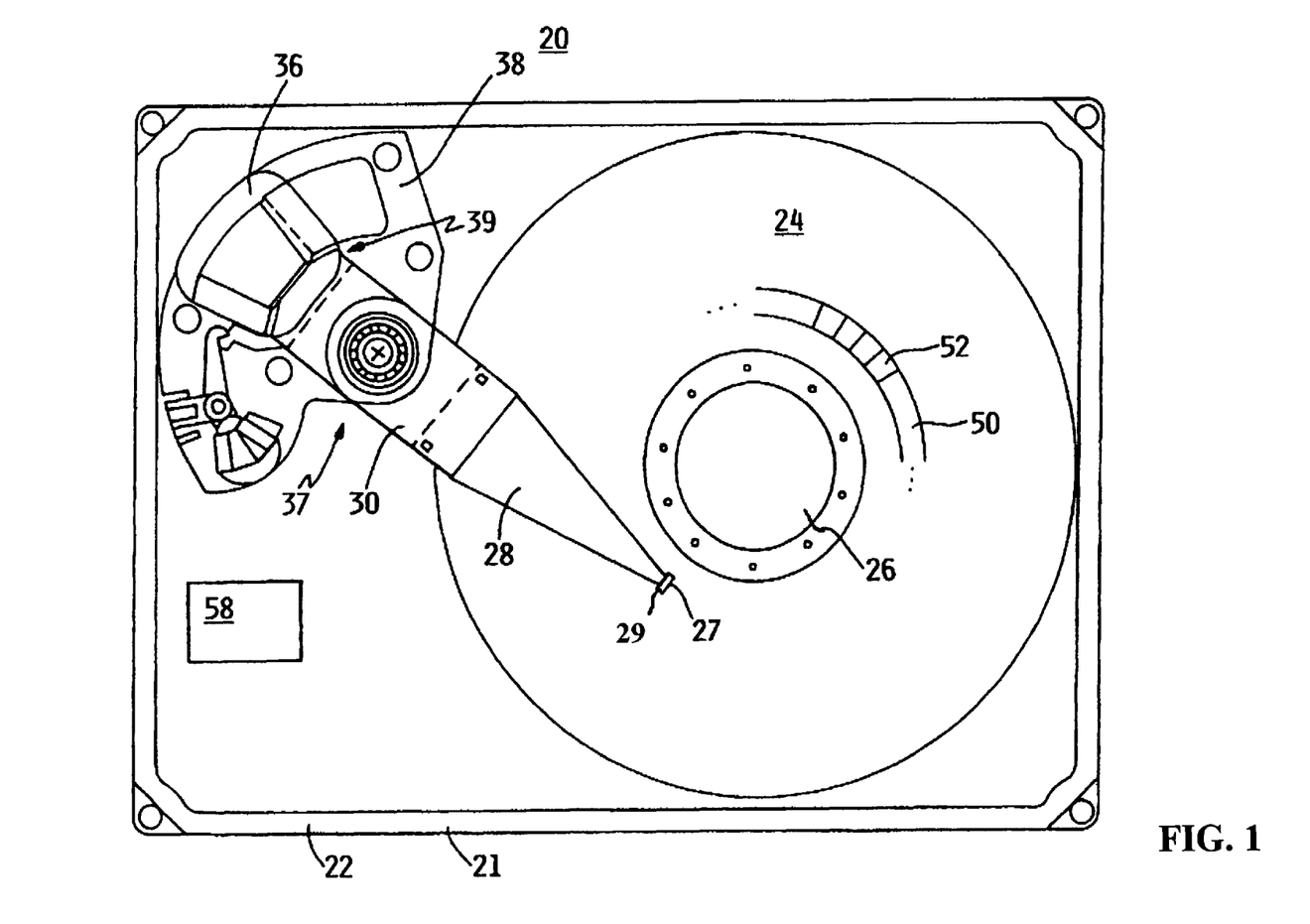
FIG. 1 is a top view of a data storage device with its upper housing cover removed and employing one or more data storage disks that have been polished with a self-cleaning colloidal slurry in accordance with the present invention.
Figure 2:
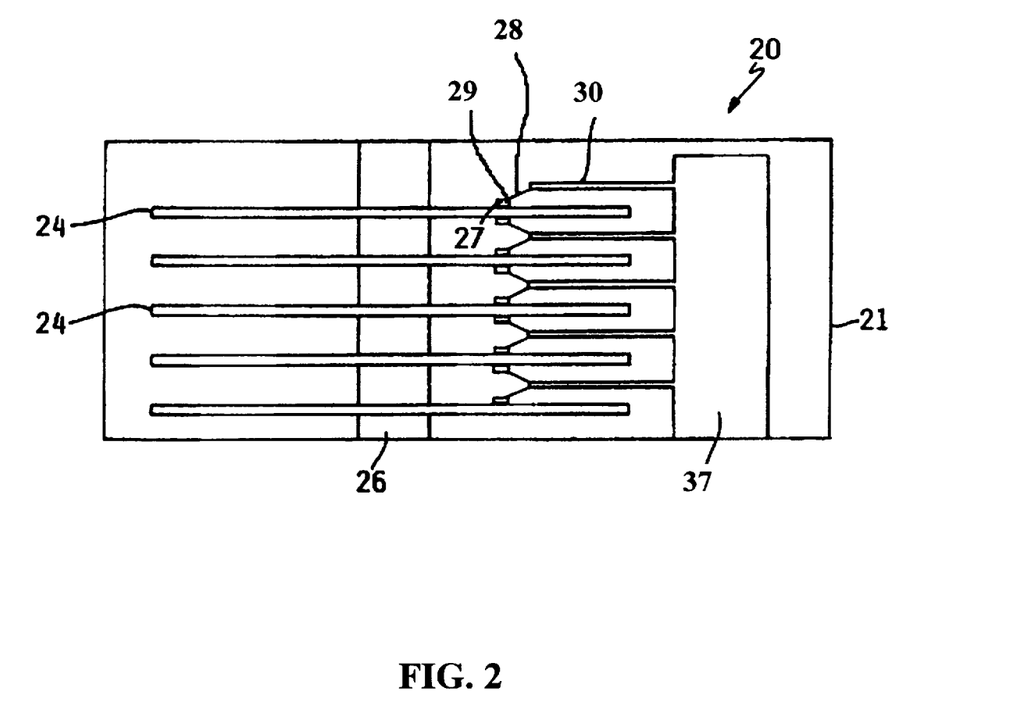
FIG. 2 is a side plan view of a data storage device comprising a plurality of data storage disks that have been polished with a self-cleaning colloidal slurry in accordance with the present invention.

Referring now to the drawings, and more particularly to FIGS. 1 and 2, there is shown a magnetic data storage device 20 utilizing magnetic disks with disk substrates that have been polished using a self-cleaning colloidal slurry in accordance with the preferred embodiment of the present invention. Magnetic data storage device 20 is shown in FIG. 1 with its cover (not shown) removed from a base 22 of a housing 21. As best seen in FIG. 2, the magnetic data storage device 20 includes one or more rigid data storage disks 24 that are rotated by a spindle motor 26. The rigid data storage disks 24 are constructed with a disk substrate upon which a recording layer is formed. In an exemplary construction, a magnetizable recording layer is formed on a glass disk substrate. Alternatively, an optical recording layer or a magneto-optical recording layer may be formed on the disk substrate in lieu of the magnetizable recording layer.

Referring back to FIG. 1, an actuator assembly 37 typically includes a plurality of interleaved actuator arms 30, with each arm having one or more suspensions 28 and transducers 27 mounted on airbearing sliders 29. The transducers 27 typically include components both for reading and writing information to and from the data storage disks 24. Each transducer 27 may be, for example, a magnetoresistive (MR) head having a write element and a MR read element. Alternatively, each transducer may be an inductive head having a combined read/write element or separate read and write elements, or an optical head having separate or combined read and write elements. The actuator assembly 37 includes a coil assembly 36 which cooperates with a permanent magnet structure 38 to operate as an actuator voice coil motor (VCM) 39 responsive to control signals produced by a controller 58. The controller 58 preferably includes control circuitry that coordinates the transfer of data to and from the data storage disks 24, and cooperates with the VCM 39 to move the actuator arms 30 and suspensions 28, to position transducers 27 to prescribed track 50 and sector 52 locations when reading and writing data from and to the data storage disks 24.

The Disk Substrate

Figure 3:
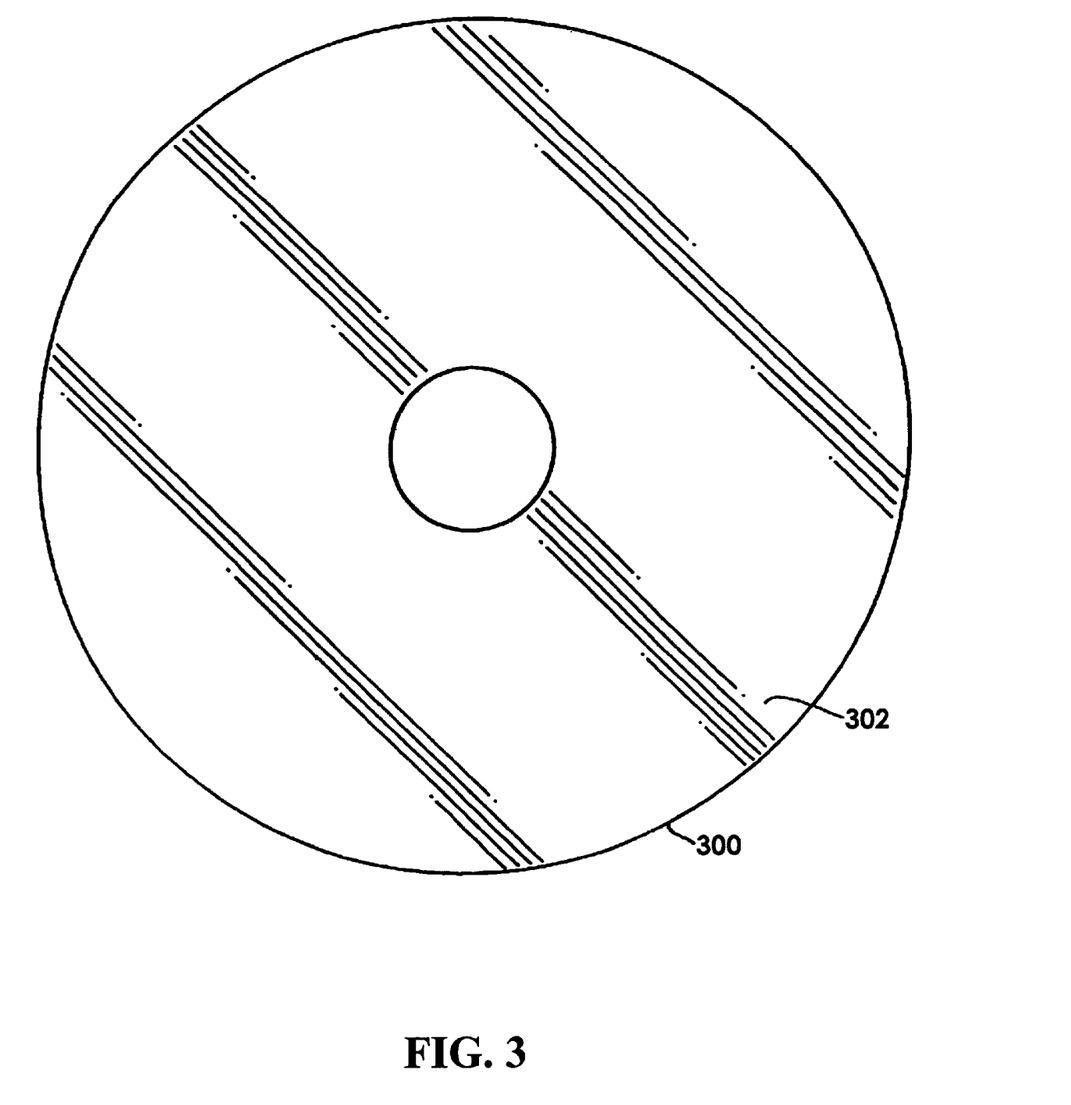
FIG. 3 is a perspective view of a disk substrate that has been polished with a self-cleaning colloidal slurry in accordance with the present invention.

FIG. 3 shows a disk substrate that has been polished using a self-cleaning colloidal slurry in accordance with the preferred embodiment of the present invention. Disk substrate 300, which has a disk substrate surface 302, is preferably a material having a relatively high specific stiffness (e.g., ≧3.8 Mpsi/gm/cc) such as a glass, glass-ceramic, ceramic, glass composite, metal or metal composite. More preferably, the disk substrate 300 is a glass, glass-ceramic or ceramic. Most preferably, the disk substrate 300 is an aluminosilicate glass. A common substrate material, e.g., aluminosilicate glass, has been chosen for the preferred embodiment to best illustrate the teachings of the present invention. However, it should be understood that the present invention is not limited to just aluminosilicate glass.

Any number of materials may be used for the disk substrate in accordance with the invention. Examples of materials that may be used as the disk substrate include alumina, sapphire, silicon carbide, boron carbide, metal matrix composites, and aluminum/boron carbide composites. Other examples of materials that may be used as the disk substrate include carbides, nitrides, oxides and phosphides or mixtures thereof. Still another example of a material that may be used as the disk substrate is a fiber reinforced composite such as graphite fiber reinforcement.

Metal matrix composites are made by pigmenting a metal, such as aluminum, with a ceramic powder. The mixture is then melted and formed into a disk substrate. The concentration of ceramic powder is balanced to provide optimal physical properties.

Other materials that may be fabricated into composites that may be used for the disk substrate include those such as silicon carbide, sapphire, titanium nitride, boron carbide, boron nitride, carbon, silicon nitride, as well as composites of glass and ceramic.

A representative list of compositions along with their relative specific stiffnesses (Mpsi/gm/cc) that may be used is found in Table 1 below.

TABLE 1

| Specific Material | Stiffness |
|---|---|
| Aluminum | 3.8 |
| Aluminosilicate glass | 4.9 |
| Lithium silicate glass | 5.2 |
| Canasite glass ceramic | 4.6 |
| Flint glass ceramic | 6.6 |
| Quartz glass | 4.9-6.1 |
| Titanium alloy | 3.3 |
| Zirconia | 5.1 |
| Alumina | 14.7 |
| Silicon carbide | 15.7-19.5 |
| Beryllium | 22.5 |
| Carbon | 2.2 |
| Alumina/aluminum composite | 5.3 |
| Boron carbide | 26.1 |
| Boron carbide/aluminum composite | 11.1-21.2 |

These materials may be used alone or in combination to provide the disk substrate of the appropriate stiffness. Preferably, the disk substrate has a stiffness of at least about 3.8 Mpsi/gm/cc.

Other useful materials for the disk substrate include glass compositions, ceramics, and mixtures thereof. Glass is generally a silicate material having a structure of silicon and oxygen where the silicon atom is tetrahedrally coordinated to surrounding oxygen atoms. Any number of materials may be used to form glass such as boron oxide, silicon oxide, germanium oxide, aluminum oxide, phosphorous oxide, vanadium oxide, arsenic oxide, antimony oxide, zirconium oxide, titanium oxide, aluminum oxide, thorium oxide, beryllium oxide, cadmium oxide, scandium oxide, lanthanum oxide, yttrium oxide, tin oxide, gallium oxide, indium oxide, lead oxide, magnesium oxide, lithium oxide, zinc oxide, barium oxide, calcium oxide, strontium oxide, sodium oxide, cadmium oxide, potassium oxide, rubidium oxide, mercury oxide, and cesium oxide.

Glass-ceramics may also be used for the disk substrate. Glass-ceramics generally result from the melt formation of glass and ceramic materials by conventional glass manufacturing techniques. Subsequently, the materials are heat cycled to cause crystallization. Typical glass-ceramics are, for example, β-quartz solid solution, $SiO_2$; β-quartz; lithium metasilicate, $Li_2O$—$SiO_2$; lithium disilicate, $Li_2$ $(SiO_2)_2$; β-spodumene solid solution; anatase, $TiO_2$; β-spodumene solid solution; rutile $TiO_2$; β-spodumene solid solution; mullite, $3Al_2O_3$—$2SiO_2$; β-spodumene dorierite, $2MgO$-$2Al_2O_3$—$5SiO_2$; spinel, $MgO$—$Al_2O_3$; MgO-stuffed; β-quartz; quartz; $SiO_2$; alpha-quartz solid solution, $SiO_2$; spinel, $MgO$—$Al_2O_3$; enstatite, $MgO$—$SiO_2$; fluorphlogopite solid solution, $KMg_3AlSi_3O_{10}F_2$; mullite, $3Al_2O_3$—$2SiO_2$; and $(Ba, Sr, Pb)Nb_2O_6$.

Ceramics are generally comprised of aluminum oxides such as alumina, silicon oxides, zirconium oxides such as zirconia or mixtures thereof. Typical ceramic compositions include aluminum silicate; bismuth calcium strontium copper oxide; cordierite; feldspar, ferrite; lead lanthanum zirconate titanate; lead magnesium nobate (PMN); lead zinc nobate (PZN); lead zirconate titanate; manganese ferrite; mullite; nickel ferrite; strontium hexaferrite; thallium calcium barium copper oxide; triaxial porcelain; yttrium barium copper oxide; yttrium iron oxide; yttrium garnet; and zinc ferrite.

Aluminum-boron-carbide composite may also be used for the disk substrate, preferably with a ratio of aluminum to boron carbide (vol. %) ranging from about 1:99 to 40:60. The specific stiffness of these materials typically ranges from about 11.1 to 21.2 Mpsi/gm/cc. These disks are commonly referred to as aluminum-boron-carbide composites or AlBC composites.

Figure 4:
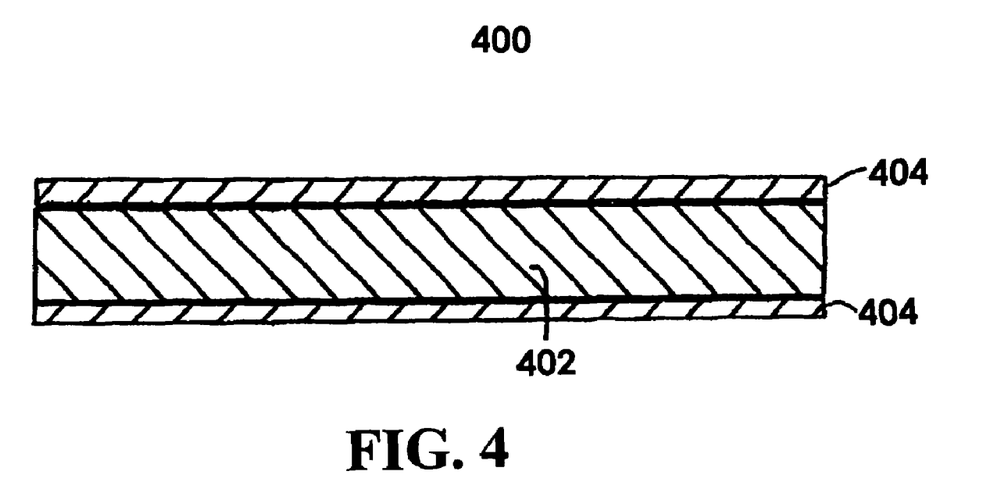
FIG. 4 is a cross-sectional view of a multi-layer disk substrate that has been polished with a self-cleaning colloidal slurry in accordance with the present invention.

The disk substrate may be made entirely of one material, or may include a coating layer applied over at least one surface of an inner core. Referring now to FIG. 4, which shows a cross section view of such a multi-layer disk substrate, a disk substrate 400 comprises an inner core 402 and upper and lower coating layers 404. The inner core 402 is preferably made of a material having a relatively high specific stiffness, such as a glass, glass-ceramic, ceramic, glass composite, polymer, polymer composite, metal or metal composite. The coating layers 404 are preferably made of a material having a defect free surface, such as an NiP layer or a glassy carbon layer.

Also, it should be understood that the present invention is not limited to disk substrates that are to be coated with a recording layer. For example, the present invention is equally applicable to disk substrates made entirely of magnetic material.

Superpolish Process

Polishing Machine and Process Parameters

Figure 5:
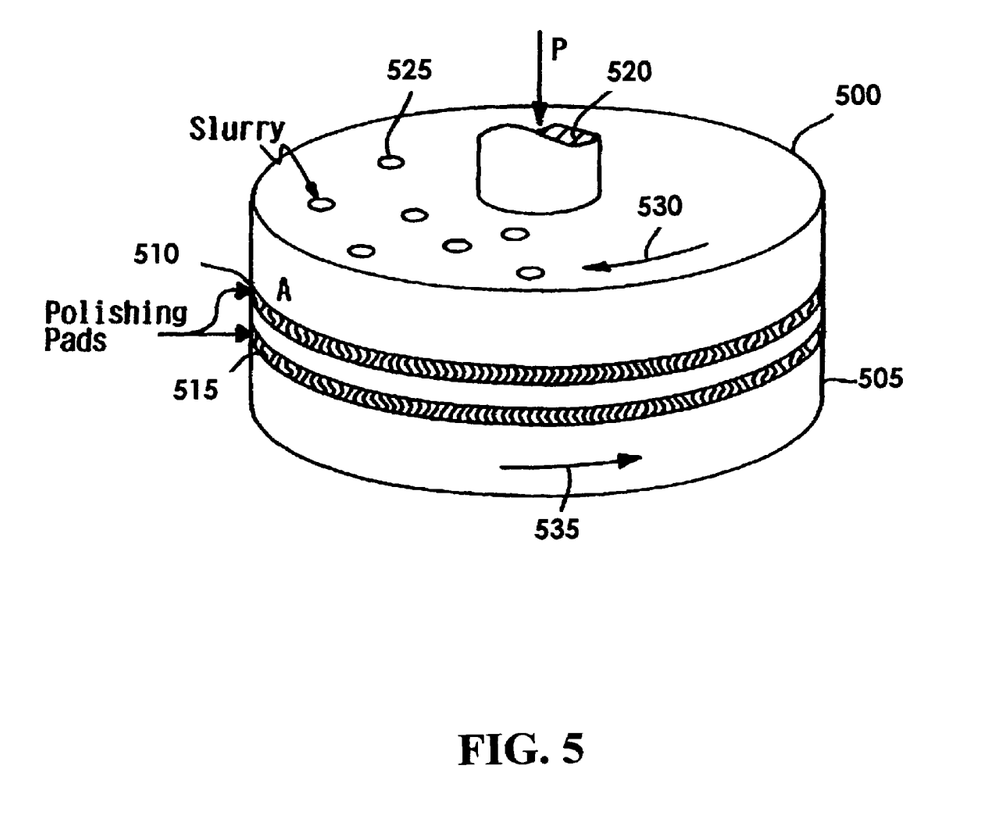
FIG. 5 shows how the polishing pads of the preferred embodiment operate to generate polishing action.

The polishing machine of the preferred embodiment is a three motor, 9B-5P SpeedFam Double-Sided Polishing Machine made by SpeedFam Corporation. However other conventional polishing machines could also be used. The double-sided polishing action of typical double sided polishing machines is shown in FIG. 5. Individual disk substrates are held between polishing pads 510 and 515 by polishing plates 500 and 505. The polishing pads used in the preferred embodiment are Napcon H7000SPH#2 polishing pads made by Fujibo; however, other polishing pads with similar characteristics could also be used. While pressure is applied axially to shaft 520, polishing plates 500 and 505 are rotated in opposite directions (shown by rotation arrows 530 and 535). The pressure applied to shaft 520 should be set to approximately 1-1.5 psi-disk (pounds per square inch of disk area). Lower polishing plate 505 and attached polishing pad 515 should be set to rotate at 60 RPM, while upper polishing plate 500 and attached polishing pad 510 should be set to rotate at 20 RPM.

Slurry supply ports, such as slurry supply ports 525, are used in introducing the slurry onto the disk substrates. As a result of this double-sided polishing action, both the top and bottom sides of the disk substrates are polished simultaneously.

Figure 6:
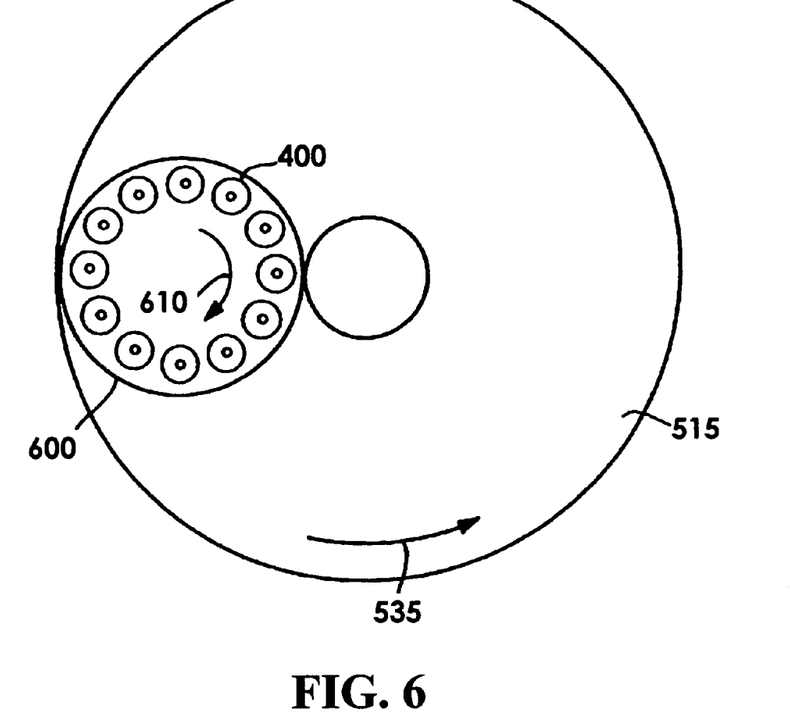
FIG. 6 shows how the disk substrate carriers of the preferred embodiment operate in relation to polishing pads to generate polishing action.

FIG. 6 shows how the disk substrate carriers, such as disk substrate carrier 600, operate in relation to lower polishing pad 515 and upper polishing pad 510. Disk substrate carrier 600 rotates in the same direction as polishing pad 510 (not shown) and in the direction opposite to polishing pad 515 (shown by arrow 535) such that disk substrates, such as disk substrate 400, are polished on both sides.

Figure 7:
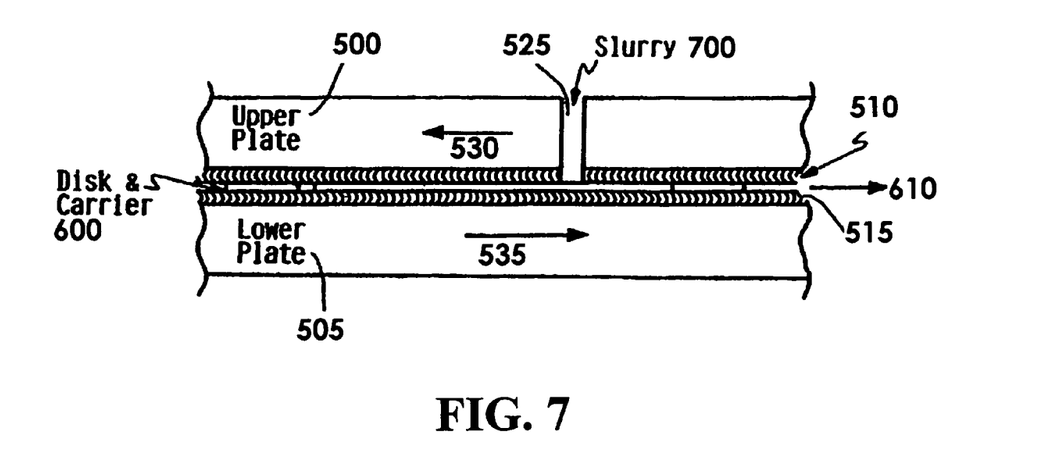
FIG. 7 shows how a self-cleaning colloidal slurry is introduced onto disk substrates in accordance with the present invention.

FIG. 7 shows how self-cleaning colloidal slurry 700 is introduced onto disk substrates during polishing. As soon as the polishing process in begun, slurry 700 is introduced onto disk substrates via slurry supply ports like slurry supply port 525. Slurry 700 is introduced onto disk substrates at a rate of 100 ml per minute. Slurry 700 then depolymerizes (e.g., breaks silicon oxygen bonds in the case of an aluminosilicate glass disk substrate) the surface of the disk substrates (not shown) located in disk substrate carrier 600. As slurry 700 depolymerizes the disk substrate material, it is removed from the disk substrate by the polishing action of the slurry 700 and the polishing pads 510 and 515. Under the above process parameters, the processing time is less than or equal to 12 minutes plus rinse. Near the end of the process, rinse water should be introduced onto the disk substrates to start slurry 700 removal off the disk substrate. Too short of a rinse time adds cleaning load to the downstream cleaning process. In the preferred embodiment, a rinse of 60 seconds is used.

Soap-Based Cleaning Process

After coming off the polisher, the disk substrates 400 are subjected to a conventional soap-based cleaning process. For example, the disk substrates 400 may be ultrasonically cleaned with soap and/or mechanically scrubbed (Oliver scrub cleaning) using soap and a pad. When used in conjunction with a conventional slurry, such conventional soap-based cleaning processes leave residual slurry material that must be removed from the surface of the disk substrates by a further cleaning mechanism (i.e., etching, micropolishing or polish etch). However, when used in conjunction with the self-cleaning colloidal slurry 700, such conventional soap-based cleaning processes completely remove the remaining slurry material leaving the surface of the disk substrates 400 free from contamination. An example of a suitable conventional soap-based cleaning process is set forth in Table 2 below.

TABLE 2

| Step # | Cleaning Process for Superfinished Disk Substrates |
|---|---|
| 1. | Place substrate in receiving tray/holding tub used to unload substrate off polisher (no more than 4 hrs.). Receiving tray/holding tub contains 0.2% Corsheen 9192LF available from Coral Chemical Co., Paramount CA + 0.1% $H_2O_2$ in deionized (DI) water at room temperature (RT). |
| 2. | Subject substrate to 40 kHz ultrasonics (US) with 2.5% Corsheen 9192LF + 0.05% $H_2O_2$ in DI water for 5 min. at 63 C. |
| 3. | Place substrate in holding tub (no more than 4 hrs.). Holding tub contains 0.2% Corsheen 9192LF + 0.1% $H_2O_2$ in DI water at RT. |
| 4. | Subject substrate to 7 sec. Oliver scrub with 2.5% Corsheen 9192LF + 0.05% $H_2O_2$ in DI water at RT. |
| 5. | Place substrate in holding tub (no more than 4 hrs.). Holding tub contains 0.2% Corsheen 9192LF + 0.1% $H_2O_2$ in DI water at RT. |
| 6. | Places substrate in SpeedFam Neptune Cleaner available from SpeedFam Corp.: Input conveyer with 0.2% Corsheen 9192LF + 0.1% $H_2O_2$ in DI water at RT; First US cleaning tank with 0.2% Corsheen 9192LF + 0.1% $H_2O_2$ in DI water at 53 C. for 3.5 min.; DI rinse for 2 min.; Polyvinyl alcohol (PVA) scrub with (pH 10.5) KOH + 0.05% $H_2O_2$ in DI water for 12-14 sec. at RT; 3 DI rinses, each for 3.5 min.; 37% isopropyl alcohol (IPA)/DI US clean and spin dry for 3.5 min. |

Subsequent Processing

After being cleaned, the disk substrates 400 may be further processed and finished by any other means known to those of skill in the art. After cleaning, for example, the disk substrates 400 may be sputtered with a series of layers, e.g., a magnetic layer and a carbon protection layer, using any of the various techniques that are conventional in the art.

Composition of Self-Cleaning Colloidal Slurry 700

Etching Agents and pH

The chemical polishing portion of this chemical-mechanical process is achieved through the use of an etching agent. If disk substrate 400 is glass, for example, metal etchant such as Ce, Zr, Ti, Fe, Sn, Al, Cr, Ni, Mn and Zn ions may be used as the etching agent to depolymerize (break silicon oxygen bonds) the surface of disk substrate 400. Acid or base etchant solutions (without metal etchant) may be used as the etchant in lieu of metal etchant. In this case, metal ions from the substrate composition will be present in slurry 700 for the superpolish process. It should be understood, however, that the particular etching agent used varies with the type of substrate involved. Preferably, $Ce^{+4}$ and/or $Fe^{+3}$ ions are used as the etching agent if disk substrate 400 is glass. The $Ce^{+4}$ ions may be provided from cerium sulfate tetrahydrate ($Ce(SO_4)_2$ $4H_2O$), for example. The $Fe^{+3}$ ions may be provided from ferric chloride hexahydrate ($FeCl_3$ $6H_2O$) and/or ferric sulfate nonahydrate ($Fe_2(SO_4)_3$ $9H_2O$), for example. The etchant may be present in solution or as a colloid or as an ion on the colloidal particles.

In addition, the pH of slurry 700 is typically adjusted to be acidic by adding acid or basic by adding caustic agent. For example, if slurry 700 contains colloidal silica with nonionic and/or non-quaternary amine cationic surfactant the preferable pH range is pH 0 to 4; more preferably pH 0.8 to 3.0; and most preferably pH 1.0 to 2.0. It should be understood, however, that the preferable pH range is dependent on the specific substrate and colloid surfaces used (e.g., different surface types need different pH's, thus a surface treatment of the colloid such as coating silica with alumina ions, shifts the pH's of the useful and stable ranges, both the isoelectric point of the surface and the materials solubility are involved) and the surfactant or surfactants used will be a function of the substrate surface, colloid surface and pH or can be a factor in pH selection. In fact, it may be desirable to make slurry 700 anywhere within the pH range of pH 0 to 12 depending on the glass, colloid type, and surfactant. For example, if slurry 700 contains colloidal alumina or alumina coated silica colloid with surfactant the preferable pH range is pH 3.5 to 10.5. On the other hand, if slurry 700 contains colloidal silica with a quaternary amine cationic surfactant, the preferable pH range is pH 7 to 12 and/or at a pH that for the substrate or colloid is around or higher in pH than its isoelectric point. Stock removal rate generally goes down with increases in pH on aluminosilicate glass substrates until silica dissolution becomes significant around pH 11-12.

If disk substrate 400 is glass, for example, acids such as sulfamic ($H_3NSO_3$), nitric ($HNO_3$) and sulfuric acid ($H_2SO_4$) may be used to adjust the pH to be acidic. It should be understood, however, that the particular acid or caustic agent used varies with the type of substrate involved. Useful acids generally include inorganic acids such as nitric acid, nitrous acid, sulfuric acid, sulfurous acid, sulfamic acid, phosphoric acid, pyrophosphoric acid, phosphorous acid, perchloric acid, hydrochloric acid, chlorous acid, hypochlorous acid, hydrofluoric acid, carbonic acid, chromic acid; as well as organic acids such as formic acid and citric acid. Useful caustic agents generally include inorganic bases such as lithium hydroxide, sodium hydroxide, potassium hydroxide, calcium hydroxide, and ammonium hydroxide.

It should be understood that the present invention is not limited to a particular etching agent, a particular acid/caustic agent, or a particular substrate type. Additionally, it should be understood that there will be an optimum pH value that varies depending upon the particular combination of substrate type, etching agent, surfactant, and colloid. When slurry 700 comes into contact with the surface of disk substrate 400, it reacts with the substrate and depolymerizes the surface such that it can be easily removed in combination with mechanical action.

Colloidal slurries, such as colloidal silica, are used on many different metal and alloy surfaces (e.g., Sendust, Permalloy, and the like) to polish to a smooth finish. Silica colloid, just as when used to polish glass, will bond to the surface oxides of metals leaving a silica contaminated surface. Using the self-cleaning colloidal slurry and process of the present invention on other materials, where silica is not present or not the main component of the substrate, such as Sendust (Fe, Si & Al) used in head wafers, requires additional considerations. The etchant ions to choose from are still the same (e.g., Ce, Zr, Ti, Fe, Sn, Al, Cr, Ni, Mn and Zn ions) but the selection of the best etchant ion depends on the corrosion stable pH range of the substrate (which for Sendust is at pH 6 to 10), the anion effects on corrosion and which ion gets left from the self-cleaning colloidal slurry at very low concentrations could pose a problem. For Sendust head wafers, this results in iron and/or aluminum being the preferred ion. Alternatively, acid or base etchant solutions (without metal etchant) may be used as the etchant in lieu of metal etchant. Such acid or base etchant solutions include the useful acids and caustic agents listed above with respect to pH adjustment.

Colloidal Particles for Substrate Material Removal

As the surface of disk substrate 400 is depolymerized, soft colloidal particles add mechanical action for a synergistic chemical mechanical polish (CMP). Use of large colloidal particles for polishing leaves a rougher surface finish on the disk substrate. Hence, the smaller the particles the better for superfinishing, larger for texturing. However, the smallest colloidal particles have low stock removal rates. Hard colloidal particles (as fumed silica) are ineffective because they leave a scratched or rougher surface. For these reasons, soft colloidal particles of intermediate size are preferred for slurry 700. The colloidal particles preferably have a nominal particle size in the range of 2 to 200 nm. The size of the colloidal particles is typically selected based on the desired surface finish and the desired stock removal rate. The smaller the colloidal particle size the smoother the surface finish and the slower the stock removal rate. Likewise, the concentration of the colloidal particles is typically selected based on the desired stock removal rate and cost. Smaller particles require higher concentrations to achieve cutting rates equivalent to larger particles.

Preferably, the colloidal particles are soft colloidal silica (as opposed to hard fumed silica), e.g., Ludox SM (colloidal silica made and dispersed in water, which is available from Grace Davidson and has spherical colloidal silica particles having a nominal size of 70 Å). While the type of colloidal particle used in the preferred embodiment is colloidal silica, it should be appreciated that the present invention is not limited to the particular type of colloidal particle used in the preferred embodiment. Other inorganic colloidal particles may be used, such as colloidal alumina. Likewise, it should be appreciated that the present invention is not limited to the particular size and concentration of colloidal particle used in the preferred embodiment.

Surfactant for Steric Hindrance Barrier

Slurry 700 also includes at least one surfactant that is adsorbed onto the surface of disk substrate 400 and/or the surface of the colloidal particles at the pH used. The surfactant has a hydrophobic section that forms a steric hindrance barrier between substrate 400 and the colloidal particles. This hydrophobic "tail" section of the surfactant has less affinity for the colloidal particles and/or disk substrate than it does for the carrying fluid of the slurry. The steric hindrance barrier prevents the colloidal particles from ever bonding to the surface of disk substrate 400 in the first place. The steric hindrance barrier takes away molecular bonding, acid/base bonding, hydrogen bonding, and some or all of the van der Walls forces (amount depends on the surfactant composition and structure chosen) for the colloidal particles sticking to the surface of disk substrate 400. This allows conventional soap-based cleaning of disk substrate 400 and removes the requirement for special and expensive extra cleaning steps, such as etching (undercutting) or micropolishing or polish etch, or combinations thereof.

Nonionic and cationic surfactants that work in acidic colloidal silica slurry to form a steric hindrance barrier include oxygen containing compounds with moieties such as ethylene oxide (e.g., ethylene oxide propylene oxide block copolymer) and polyvinyl alcohol, and nitrogen containing compounds such as alkaloids and amines. Both types of surfactants must also have a hydrophobic section of the compound to help form the steric hindrance barrier. Polydentate adsorption surfactants are preferred.

Another type of steric barrier can also be used, made by precipitating an anionic surfactant on the substrate and/or colloidal surfaces (e.g., sodium octyl sulfate at pH <7 and/or at a pH that for the substrate or colloid is around or lower in pH than its isoelectric point). This later gets removed during the cleaning process with a change in the pH to >7 and/or greater than the isoelectric point of the coated surface.

The polar section of the surfactant attaches by coulombic forces to the surface of the disk substrate and/or colloidal particles, while the hydrophobic section of the surfactant projects into the slurry solution. The coulombic forces are activated by the hydrogen protons (acidic pH) or the etchant acting on the surface of the disk substrate and/or colloidal particles. As mentioned above, the etchant is present in the slurry solution or as colloidal particles or as an ion on the colloidal silica. Attachment of polar sections of the surfactant to the surface of the disk substrate and/or colloidal particles is thermodynamically favored at the pH of the slurry. For example, an anionic (negatively charged) constituent of the polar section (e.g., O in the case of oxygen containing nonionic surfactants such as ethylene oxide and N in the case of nitrogen containing nonionic surfactants such as alkaloids) is attracted to the surface of the disk substrate and/or colloidal particles which are made protonic (positively charged) by the acid pH or the etchant. The hydrophobic section of the surfactant, on the other hand, has less affinity for the colloidal particles and/or disk substrate than it does for the carrying fluid of the slurry. Also, the degree of match between the surfactant's electron donor atomic spacing and that of the surface of the disk substrate and/or colloidal particles active positive charge sites has an impact on the effectiveness of the steric hindrance barrier.

One type of commercially available surfactant that may be used in colloidal silica slurry to form a steric hindrance barrier is Corsheen CorAdd 9195 available from the Coral Chemical Company (Paramount, Calif.). Corsheen CorAdd 9195 is a proprietary compound of Coral Chemical Company, but is believed to be an ethylene oxide propylene oxide block copolymer plus alkaloid component. There are numerous other commercial surfactants available, many of which are believed to work in colloidal slurries to form a steric hindrance barrier. Some commercially available surfactants tested include:

Amberclean SCA24 available from Innovative Organics, Anaheim, Calif.;
PAA (poly acrylic acid of molecular weight 2000) available from Aldrich, Milwaukee, Wis.;
Corsheen—190 available from Coral Chemical Co., Paramount, Calif.;
Corsheen—191 available from Coral Chemical Co., Paramount, Calif.;
TRITON X-100 available from Union Carbide Corp., Charleston, W.Va.;
Valtron SP2201 available from Valtech Corp, Pughtown, Pa.;
Corsheen CorAdd 9192LF (has ethylene oxide and propylene oxide groups) available from Coral Chemical Co., Paramount, Calif.;
Amberclean L20 available from Innovative Organics, Anaheim, Calif.;
Glycol (has alcohol groups on adjacent carbons) available from Aldrich, Milwaukee, Wis.;
SOLSPERSE 2000 (has amine groups with hydrocarbon backbone) available from ICI Americas Inc.;
BRIJ 30 available from ICI Americas Inc.;
BRIJ 99 available from ICI Americas Inc.;
Morclean GC 12 (unknown composition) available from Oakite Products, Berkeley Heights, N.J.;
Tamol 960 available from Rohm & Haas Co., Philadelphia, Pa.

Table 3 below sets forth the effectiveness of the above-listed commercially available surfactants in changing a glass surface to a hydrophobic character in water. The first column lists the surfactant, the second column lists the pH of the surfactant solution and whether surface water sheets off or beads off at 23 C after soaking for 10 min., the third column lists whether surface water sheets off or beads off at 23 C when the pH of the surfactant solution is adjusted to 2.5 with $HNO_3$ after soaking for 10 min., and the fourth column lists whether surface water sheets off or beads off at 60 C when the pH of the surfactant solution is adjusted to 2.5 with $HNO_3$ after soaking for 10 min. "Sheets Off" means the surface stayed water wetted and the film drained down when held vertical. "Beads Off" means the surface water formed beads and left the surface as droplets. "Beads Off" indicates that the surfactant is relatively more effective in changing the glass surface to a hydrophobic character in water.

TABLE 3

| SURFACTANT and its SOLUTION pH | Step A - Surfactant Solution pH 23 C. 10 min. | Step B - pH 2.5 with $HNO_3$ 23 C. 10 min. | Step C - pH 2.5 with $HNO_3$ 60 C. 10 min. |
|---|---|---|---|
| Amberclean SCA24 | 2.66/Sheets Off | Sheets Off | Sheets Off |
| PAA 2000 MW | 3.25/Sheets Off | Sheets Off | Sheets Off |
| Corsheen - 190 | 4.47/Sheets Off | Sheets Off | Sheets Off |
| Corsheen - 191 | 4.56/Sheets Off | Sheets Off | Sheets Off |
| TRITON X-100 | 5.42/Sheets Off | Sheets Off | Sheets Off |
| Valtron SP2201 | 10.61/Sheets Off | Sheets Off | Sheets Off |
| Corsheen CorAdd 9192LF | 4.58/Sheets Off | Sheets Off | Beads Off |
| Amberclean L20 | 11.62/Sheets Off | Sheets Off | Sheets Off |
| Glycol | 5.04/Sheets Off | Sheets Off | Beads Off |
| SOLSPERSE 2000 | 10.29/Sheets Off | Beads Off | Beads Off |
| BRIJ 30 | 4.78/Sheets Off | Sheets Off | Sheets Off |
| BRIJ 99 | 4.98/Sheets Off | Sheets Off | Sheets Off |
| Morclean GC 12 | 9.97/Sheets Off | Sheets Off | Beads Off |
| Tamol 960 | 8.35/Sheets Off | Sheets Off | Sheets Off |

Stabilization Agents

Stabilization agents can be both ionic charge type and steric type. With stabilized colloidal silica sols ionic charge agents are alkali bases, ammonium hydroxide or organic amine bases while steric agents are organic with the exception of maybe water acting as an agent for low pH deionized sols with limited effect. Organic steric stabilized sols are first deionized (made salt free) through ion exchange and are partially aqueous with the most stable ones having all the water removed. When the superfinish slurry of the present application or U.S. Pat. No. 6,236,542 is made by acidifying the colloidal silica, these stabilizers do not prevent some interparticle siloxane bonding (particles sticking to each other) and thus also bonding subsequently to the glass substrate during polish. This is due to the reduction in thickness of the ionic double layer caused by increased solution ionic content with the addition of acid. They do prevent enough polymerization that the slurry does not thicken so much it can not be used as a polishing fluid pumped though lines and large pore (3 microns) filters to the polishing pad. The organic surfactants forming the steric hindrance barrier of the present invention do not stabilize the colloidal dispersion but form a steric hindrance layer between the colloidal silica and the glass disk substrate surface.

EXAMPLES

Example 1

Two solutions were first made. Solution A was first made by placing 13.6 grams of cerium sulfate tetrahydrate (Ce$(SO_4)_2$ $4H_2O$ MW 404.31) and 240 grams of sulfamic acid ($H_3NSO_3$ MW 97.1) in a beaker and adding 1200 ml of deionized (DI) water and stirring at room temperature (RT) until dissolved. Solution B was made by pouring 1840 ml DI water into 4480 ml of Ludox SM with stirring, and then stirring a mixture of 6.4 grams of Corsheen CorAdd 9195 and 480 ml DI water into that. Both Solution A and Solution B were then put through a 0.1 micron filter to remove any particles that might cause scratching. Solution B was then poured into Solution A over a 5 second period with strong mixing to form the slurry. The final pH of the slurry was 1.2, while its final volume 8 liters.

The slurry was used to superfinish a 95 mm aluminosilicate glass disk substrate at 1.0 psi-disk for 12 minutes on a conventional double-sided polishing machine. The slurry temperature was 20-35 C.

After coming off the polishing machine, the disk substrate was subjected to the conventional soap-based cleaning process set forth in Table 2 above. The conventional soap-based cleaning process completely removed the remaining slurry material leaving the surface of the disk substrate free from contamination as seen by AFM. The surface roughness measurements of the disk substrate of this example are shown summarized in Table 4 below, along with those of the other examples, a reference 95 mm aluminosilicate glass disk substrate polished with a standard Ce slurry (i.e., an aqueous slurry of cerium oxide particles), and another reference 95 mm aluminosilicate glass disk substrate polished with Ferro SRS 596 slurry (thought to be composed of <50% lanthanum series oxides and fluorides, <20% amorphous fumed silica and <2% titanium dioxide as discussed above in the Background section of the present application) available from Ferro Electronic Materials, Penn Yan, N.Y. The reference substrates were superfinished using the same polisher, pad and process conditions used in the examples.

As shown in Table 4, the average surface roughness of the disk substrate surface of this example was less than 2 Å. In contrast, the average surface roughness of the disk surface of the reference substrate polished with standard Ce slurry was 5.71 Å and that of the reference substrate polished with Ferro 596 slurry was 2.73 Å.

Example 2

Two solutions were first made. Solution A was first made by placing 216.4 grams of ferric chloride hexahydrate ($FeCl_3$ $6H_2O$ MW 270.3) and 160 grams of sulfamic acid ($H_3NSO_3$ MW 97.1) in a beaker and adding 1200 ml of deionized (DI) water and stirring at room temperature (RT) until dissolved. Solution B was made by pouring 1840 ml DI water into 4480 ml of Ludox SM with stirring, and then stirring a mixture of 6.4 grams of Corsheen CorAdd 9195 and 480 ml DI water into that. Both Solution A and Solution B were then put through a 0.1 micron filter to remove any particles that might cause scratching. Solution B was then poured into Solution A over a 5 second period with strong mixing to form the slurry. The final pH of the slurry was 1.2, while its final volume 8 liters.

The slurry was used to superfinish a 95 mm aluminosilicate glass disk substrate 1.0 psi-disk for 12 minutes on a conventional double-sided polishing machine. The slurry temperature was 20-35 C.

After coming off the polishing machine, the disk substrate was subjected to the conventional soap-based cleaning process set forth in Table 2 above. The conventional soap-based cleaning process completely removed the remaining slurry material leaving the surface of the disk substrate free from contamination as seen by AFM. The surface roughness measurements of the disk substrate of this example are shown summarized in Table 4 below. As shown in Table 4, the average surface roughness of the disk substrate surface of this example was less that 2 Å.

Example 3

Two solutions were first made. Solution A was first made by placing 1600 ml of DI water in a beaker and adding 140 ml of 50% nitric acid ($HNO_3$) and stirring in 56.4 grams ferric sulfate nonahydrate ($Fe_2(SO_4)_3$ $9H_2O$ MW 562.0) until dissolved. Solution B was made by pouring 1300 ml DI water into 4480 ml of Ludox SM with stirring, and then stirring a mixture of 6.4 grams of Corsheen CorAdd 9195 and 480 ml DI water into that. Both Solution A and Solution B were then put through a 0.1 micron filter to remove any particles that might cause scratching. Solution B was then poured into Solution A over a 5 second period with strong mixing to form the slurry. The final pH of the slurry was 1.2, while its final volume 8 liters.

The slurry was used to superfinish a 95 mm aluminosilicate glass disk substrate 1.0 psi-disk for 12 minutes on a conventional double-sided polishing machine. The slurry temperature was 20-35 C.

After coming off the polishing machine, the disk substrate was subjected to the conventional soap-based cleaning process set forth in Table 2 above. The conventional soap-based cleaning process completely removed the remaining slurry material leaving the surface of the disk substrate free from contamination as seen by AFM. The surface roughness measurements of the disk substrate of this example are shown summarized in Table 4 below. As shown in Table 4, the average surface roughness of the disk substrate surface of this example was less that 2 Å.

Example 4

Two solutions were first made. Solution A was first made by placing 13.6 grams of cerium sulfate tetrahydrate (Ce$(SO_4)_2$ $4H_2O$ MW 404.31) in a mixture of 50% sulfuric acid and 216 ml of DI water in a beaker and heating to 90-100 C until dissolved, then cooling to less than 40 C and adding 600 ml DI water with stirring. Solution B was made by pouring 2120 ml DI water into 4480 ml of Ludox SM with stirring, and then stirring a mixture of 6.4 grams of Corsheen CorAdd 9195 and 480 ml DI water into that. Both Solution A and Solution B were then put through a 0.1 micron filter to remove any particles that might cause scratching. Solution B was then poured into Solution A over a 5 second period with strong mixing to form the slurry. The final pH of the slurry was 1.2, while its final volume 8 liters.

The slurry was used to superfinish a 95 mm aluminosilicate glass disk substrate 1.0 psi-disk for 12 minutes on a conventional double-sided polishing machine. The slurry temperature was 20-35 C.

After coming off the polishing machine, the disk substrate was subjected to the conventional soap-based cleaning process set forth in Table 2 above. The conventional soap-based cleaning process completely removed the remaining slurry material leaving the surface of the disk substrate free from contamination as seen by AFM. The surface roughness measurements of the disk substrate of this example are shown summarized in Table 4 below. As shown in Table 4, the average surface roughness of the disk substrate surface of this example was less that 2 Å.

TABLE 4

| Example # | Stock Removal Rate Polished at 8 psi for 13 min. | AFM $R_q$ Å | AFM $R_p$ Å | AFM$_{max}$ Å |
|---|---|---|---|---|
| Ref. Standard Ce Slurry Polished Glass Disk | 2.00 microns/side | 5.71 | 26.3 | 98.8 |
| Ferro SRS 596 Slurry Polished Glass Disk | 0.59 microns/side | 2.73 | 14.2 | 31.0 |
| Example 1 Ce & $H_3NSO_3$ | 0.53 microns/side | 1.60 | 14.0 | 18.9 |
| Example 2 Fe & $H_3NSO_3$ | 0.35 microns/side | 1.70 | 13.2 | 25.2 |
| Example 3 Fe & $HNO_3$ | 0.44 microns/side | 1.57 | 14.0 | 18.9 |
| Example 4 Ce & $H_2SO_4$ | 0.58 microns/side | 1.60 | 17.0 | 28.1 |

Consequently, the self-cleaning colloidal slurry can provide a disk substrate having superior surface uniformity. A significant decrease in flyheight can be achieved due to the highly uniform, glide defect free surface provided by the self-cleaning colloidal slurry. In turn, the decreased flyheight can advantageously result in increased transducer readback sensitivity and increased areal density.

Moreover, remaining contamination from the self-cleaning colloidal slurry is completely removed from the surface of the disk substrate by conventional soap-based cleaning processes, without an additional etching or micropolishing or cleaning polish etch. Unlike the cleaning techniques of etching or micropolishing, the enhanced cleaning mechanism provided by the present invention does not alter the superfinish of the disk substrate or its surface stability to corrosion.

These traits, along with low production cycle times and costs, make the present invention an attractive solution to keenly felt needs in the data storage device manufacturing industry.

While this invention has been described with respect to the preferred and alternative embodiments, it will be understood by those skilled in the art that various changes in detail may be made therein without departing from the spirit, scope, and teaching of the invention. For example, the invention may be utilized in texturing the surface of a disk substrate, rather than in superfinishing it. Texturing may be accomplished, for example, by using relatively larger colloidal particles (preferably 30-200 nm, and more preferably 70-200 nm) in the self-cleaning slurry and a relatively more aggressive polishing pad on an Oliver texturing machine. Texturing provides a circumferential texture pattern on the surface of the disk substrate that improves the magnetic characteristics of the magnetic data storage disk fabricated from the substrate.

The invention may also be utilized in other magnetic data storage device applications, such as transducer fabrication (e.g., superfinishing a head wafer substrate that is typically a material, such as Sendust (iron-silicon-aluminum alloys), Permalloy (iron-base alloys containing about 45-80% nickel), or the like, having desired physical and magnetic properties). In addition, the invention may be utilized in other data storage medium applications, such as in optical storage medium applications. Additionally, the invention may be utilized in applications other than data storage device applications, such as in semiconductor fabrication applications, lens fabrication applications, mirror fabrication applications or other applications that involve finishing a substrate. Accordingly, the herein disclosed invention is to be limited only as specified in the following claims.

The invention claimed is:

1. A process for superfinishing a surface of a substrate, the process comprising the steps of:
    applying a self-cleaning colloidal slurry to the surface of the substrate, the self-cleaning colloidal slurry comprising
        a carrying fluid,
        colloidal particles,
        etchant for etching the substrate,
        a surfactant precipitated onto a surface of at least one of the substrate and the colloidal particles, the surfactant having a hydrophobic section that forms a steric hindrance barrier between the substrate and the colloidal particles,
        wherein the substrate is selected from a group consisting of a glass disk substrate, a ceramic disk substrate, and a glass-ceramic disk substrate for use in a disk drive data storage device;
    mechanically rubbing the surface of the substrate with a pad while contacting the surface of the substrate with the self-cleaning colloidal slurry.

2. The process as recited in claim 1, wherein the surfactant is an anionic surfactant.

3. The process as recited in claim 2, wherein the anionic surfactant is sodium octyl sulfate.

4. The process as recited in claim 1, further comprising the step of adjusting the pH of the self-cleaning colloidal slurry, prior to completing the mechanically rubbing step, so that the self-cleaning colloidal slurry has a pH that is approximately equal to or less than the isoelectric point of the surface onto which the surfactant is precipitated.

5. The process as recited in claim 4, further comprising the step of removing the precipitated surfactant from the surface onto which the surfactant is precipitated, after completing the mechanically rubbing step, by changing the pH to be approximately greater than the isoelectric point of the surface onto which the surfactant is precipitated.

6. The process as recited in claim 3, further comprising the step of adjusting the pH of the self-cleaning colloidal slurry, prior to completing the mechanically rubbing step, so that the self-cleaning colloidal slurry has a pH that is approximately $\leq 7$.

7. The process as recited in claim 6, further comprising the step of removing the precipitated surfactant from the surface onto which the surfactant is precipitated, after completing the mechanically rubbing step, by changing the pH to be approximately >7.

8. A process for superfinishing a surface of an aluminosilicate glass substrate for use in a disk drive data storage device, the process comprising the steps of:
applying a self-cleaning colloidal slurry to the surface of the aluminosilicate glass substrate, the self-cleaning colloidal slurry comprising
a carrying fluid,
colloidal silica particles having a nominal size of approximately 2-200 nm;
etchant for etching the aluminosilicate glass substrate, wherein the etchant is a metal etchant selected from a group consisting of $Ce^{+4}$ and $Fe^{+3}$ ions, and combinations thereof, and wherein the metal etchant is present in solution and/or as a colloid and/or on the colloidal silica particles,
an ethylene oxide propylene oxide block copolymer surfactant adsorbed onto a surface of at least one of the aluminosilicate glass substrate and the colloidal silica particles, the ethylene oxide propylene oxide block copolymer surfactant having a hydrophobic section that forms a steric hindrance barrier between the aluminosilicate glass substrate and the colloidal silica particles,
wherein the self-cleaning colloidal slurry has a pH of approximately 0 to 4;
mechanically rubbing the surface of the aluminosilicate glass substrate with a pad while contacting the surface of the aluminosilicate glass substrate with the self-cleaning colloidal slurry.

9. The process as recited in claim 8, further comprising the step of cleaning the surface of the alumino silicate glass substrate using standard soap solutions, wherein the cleaning step is performed after the mechanically rubbing step, and wherein the cleaning step removes substantially all of the remaining contamination from the surface of the alumino silicate glass substrate, the remaining contamination being at least partially due to the colloidal silica particles in the self-cleaning colloidal slurry.

10. A process for finishing a surface of an aluminosilicate glass substrate for use in a disk drive data storage device, the process comprising the steps of:
applying a self-cleaning colloidal slurry to the surface of the aluininosilicate glass substrate, the self-cleaning colloidal slurry comprising
a carrying fluid,
colloidal silica particles,
etchant for etching the aluminosilicate glass substrate, wherein the etchant is a metal etchant selected from a group consisting of $Ce^{+4}$ and $Fe^{+3}$ ions, and combinations thereof, and wherein the metal etchant is present in solution and/or as a colloid and/or on the colloidal silica particles,
an ethylene oxide propylene oxide block copolymer surfactant adsorbed and/or precipitated onto a surface of at least one of the aluminosilicate glass substrate and the colloidal silica particles, the ethylene oxide propylene oxide block copolymer surfactant having a hydrophobic section that forms a steric hindrance barrier between the aluminosilicate glass substrate and the colloidal silica particles,
wherein the self-cleaning colloidal slurry has a pH of approximately 0 to 4,
and wherein the colloidal silica particles have a nominal size of approximately 70-200 nm;
mechanically rubbing the surface of the aluminosilicate glass substrate with a pad while contacting the surface of the alumino silicate glass substrate with the self-cleaning colloidal slurry to provide a textured surface on the aluminosilicate glass substrate.

11. The process as recited in claim 10, further comprising the step of cleaning the surface of the alumino silicate glass substrate using standard soap solutions, wherein the cleaning step is performed after the mechanically rubbing step, and wherein the cleaning step removes substantially all of the remaining contamination from the surface of the aluminosilicate glass substrate, the remaining contamination being at least partially due to the colloidal silica particles in the self-cleaning colloidal slurry.

* * * * *